(12) United States Patent
Kelley

(10) Patent No.: US 11,549,864 B2
(45) Date of Patent: Jan. 10, 2023

(54) CONDUCTOR SUPPORT STRUCTURE POSITION MONITORING SYSTEM

(71) Applicant: Aclara Technologies LLC, St. Louis, MO (US)

(72) Inventor: Michael Lee Kelley, Birmingham, AL (US)

(73) Assignee: Aclara Technologies LLC, St. Louis, MO (US)

( * ) Notice: Subject to any disclaimer, the term of this patent is extended or adjusted under 35 U.S.C. 154(b) by 0 days.

(21) Appl. No.: 17/172,607

(22) Filed: Feb. 10, 2021

(65) Prior Publication Data
US 2021/0247273 A1  Aug. 12, 2021

Related U.S. Application Data

(60) Provisional application No. 62/972,903, filed on Feb. 11, 2020.

(51) Int. Cl.
| | |
|---|---|
| *G01M 99/00* | (2011.01) |
| *G08B 21/18* | (2006.01) |
| *G01P 15/18* | (2013.01) |
| *G01K 3/00* | (2006.01) |

(52) U.S. Cl.
CPC .............. *G01M 99/00* (2013.01); *G01K 3/005* (2013.01); *G01P 15/18* (2013.01); *G08B 21/182* (2013.01)

(58) Field of Classification Search
CPC .. G01M 99/00; G01M 5/0025; G01M 5/0041; G01M 5/0066; G01K 3/005; G01P 15/18; G08B 21/182
USPC ......................................................... 702/184
See application file for complete search history.

(56) References Cited

U.S. PATENT DOCUMENTS

| | | |
|---|---|---|
| 5,719,564 A | 2/1998 | Sears |
| 6,875,917 B1 | 4/2005 | Wood et al. |
| 7,609,158 B2 | 10/2009 | Banting et al. |
| 2011/0288777 A1 | 11/2011 | Gupta |
| 2016/0313209 A1 | 10/2016 | Zee et al. |
| 2017/0030943 A1 | 2/2017 | Nulty |
| 2017/0045571 A1 | 2/2017 | Joseph et al. |
| 2017/0102234 A1 | 4/2017 | Oshetski et al. |
| 2017/0227596 A1* | 8/2017 | Sozer ................... G01M 5/0058 |

(Continued)

FOREIGN PATENT DOCUMENTS

WO  WO-2018234204 A1 * 12/2018  .............. F21S 8/085

OTHER PUBLICATIONS

PCT/US2021/0017411 International Search Report and Written Opinion dated May 7, 2021 (19 pages).

*Primary Examiner* — Douglas X Rodriguez
*Assistant Examiner* — Byung Ro Lee
(74) *Attorney, Agent, or Firm* — Michael Best & Friedrich LLP

(57) ABSTRACT

A sensor unit includes an orientation sensor, an electronic processor coupled to the orientation sensor, and memory coupled to the electronic processor and storing support structure configuration data and instructions. The instructions, when executed by the electronic processor, cause the sensor unit to monitor a position of a conductor support structure associated with the sensor unit based on data from the orientation sensor and generate an alert message responsive to determining that the position violates a position threshold. The position threshold is generated based on the support structure configuration data.

17 Claims, 4 Drawing Sheets

(56) References Cited

U.S. PATENT DOCUMENTS

2019/0067941 A1 2/2019 Smith et al.
2020/0025644 A1* 1/2020 Brinker ................ G08B 21/182

* cited by examiner

CONDUCTOR SUPPORT STRUCTURE POSITION MONITORING SYSTEM

CROSS-REFERENCE TO RELATED APPLICATIONS

This application claims priority to, and benefit from, U.S. Provisional Patent Application No. 62/972,903, filed Feb. 11, 2020, the contents of which are herein incorporated by reference in their entirety.

FIELD

Embodiments of the disclosure relate to monitoring power distribution systems and, more particularly, to a conductor support structure position monitoring system.

BACKGROUND

Conductors, such as power conductors are widely used in many settings. They form an important part of the power distribution system, carrying power from generation facilities to the locations where it is used by customers. A power distribution system may include many types of conductors, for example, high voltage conductors may be used closer to the power generation facilities or for long distance transmission, and medium and lower voltage conductors may be used closer to the locations where the power is used, such as homes and businesses.

Many power conductors run overhead, meaning that the conductors are attached to conductor support structures that elevate the conductors above the ground. High voltage power conductors are generally routed through open spaces, but medium and low voltage conductors, which are closer to locations that use the power, are more likely to run over or by roads as well as trees or other objects. Other types of conductors are commonly supported by conductor support structures, such as communication lines.

A power company may spend significant amounts of resources repairing and maintaining power conductors and the conductor support structures. Environmental conditions or accidents may cause damage to the conductor support structures and the supported conductors. For example, ice and snow buildup on a conductor may load the conductor to the point that it stretches and breaks or it causes damage to the utility pole. Wind can also be a contributing factor to breakage or wear of conductors or conductor support structures. Wind can directly cause damage to a conductor or it can cause tree limbs or other obstacles to come in contact with the conductor or conductor support structures, thus causing damage. A power conductor may also be damaged by objects, such as vehicles, fallen trees, or the like.

SUMMARY

Conductor support structure monitoring is facilitated through a sensor unit that collects position data for the conductor support structure and identifies an alert condition responsive to the position data violates a position threshold. The position threshold may be generated based on support structure configuration data, such as conductor orientation, guy wire orientation, and adjacent hazard orientation. In large scale events, such as storms, where multiple conductor support structures are damaged, maintenance activities may be prioritized based on the support structure configuration data indicating the presence of nearby roadways, schools, or other high risk areas.

In particular, embodiments described herein provide a utility pole position monitoring system and methods for monitoring utility pole position.

In one embodiment, a sensor unit includes an orientation sensor, an electronic processor coupled to the orientation sensor, and memory coupled to the electronic processor and storing support structure configuration data and instructions. The instructions, when executed by the electronic processor, cause the sensor unit to monitor a position of a conductor support structure associated with the sensor unit based on data from the orientation sensor and generate an alert message responsive to determining that the position violates a position threshold. The position threshold is generated based on the support structure configuration data.

In another embodiment, a system includes a number of sensor units and a monitoring unit. Each of the sensor units includes an orientation sensor, an electronic processor coupled to the orientation sensor, and a memory coupled to the electronic processor. The electronic processor is configured to monitor a position of a conductor support structure associated with the sensor unit based on data from the orientation sensor. The electronic processor is further configured to generate an alert message responsive to determining that the position violates a position threshold. The monitoring unit is configured to receive alert messages from the plurality of sensor units and generate a prioritized list of maintenance activities based on the alert messages.

In another embodiment, a method for monitoring conductor support structures includes receiving in an electronic processor data from an orientation sensor in a sensor unit. A position of a conductor support structure associated with the sensor unit is determined in the electronic processor based on data from the orientation sensor. An alert message is communicated by the electronic processor on a communication interface of the sensor unit responsive to determining that the position violates a position threshold. The position threshold is generated based on support structure configuration data associated with the conductor support structure associated with the sensor unit.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claims, and explain various principles and advantages of those embodiments.

Figure 1:
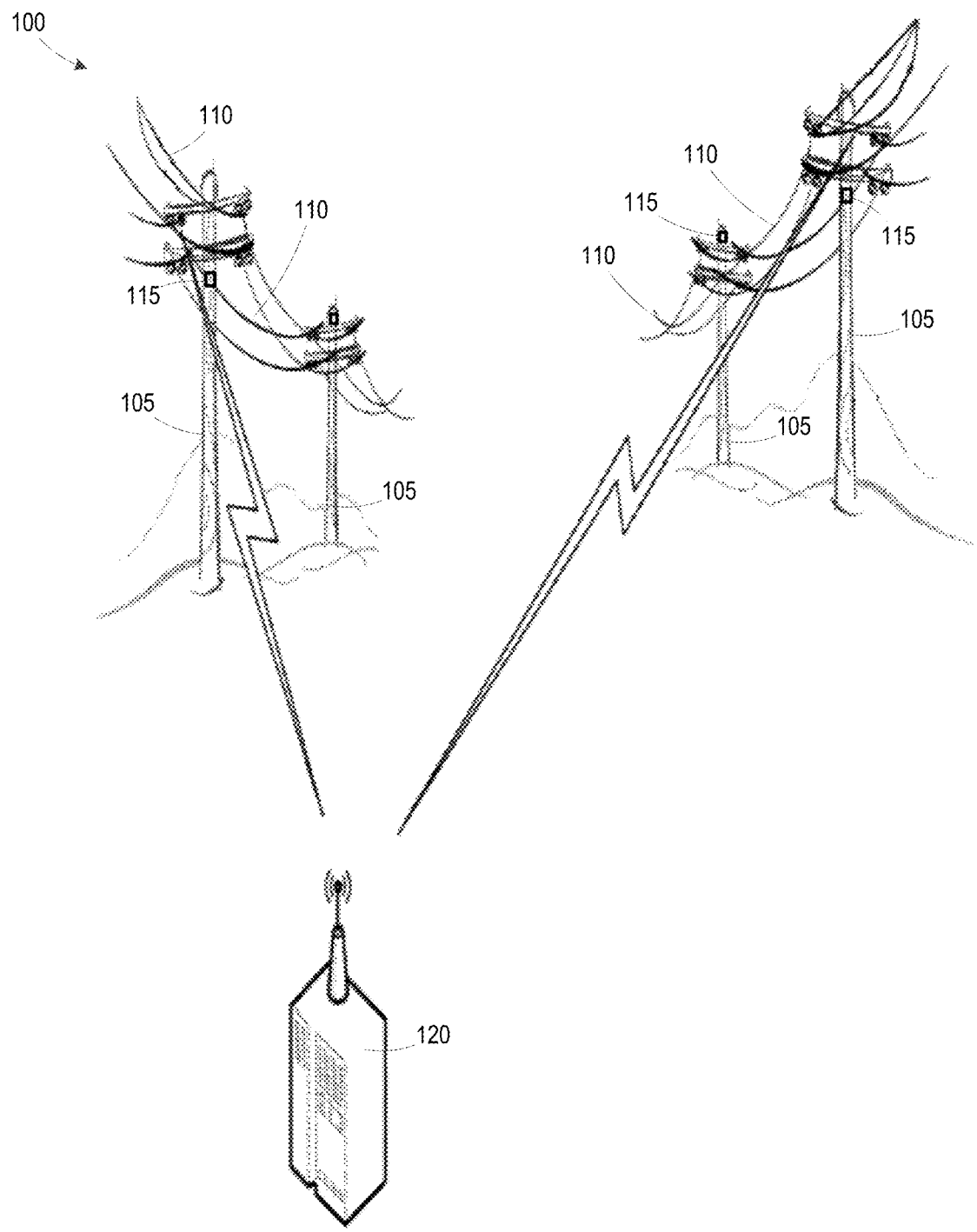
FIG. 1 is a diagram of a conductor support structure monitoring system, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of other embodiments and of being practiced or of being carried out in various ways.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" includes all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Also, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

FIG. 1 illustrates a conductor support structure monitoring system 100, according to some embodiments. The conductor support structure monitoring system 100 monitors multiple conductor support structures 105 supporting overhead conductors 110. In some embodiments, the conductors 110 are power lines, but other types of conductors, such as communication lines may be supported by the conductor support structures 105. In some embodiments, the conductor support structure monitoring system 100 monitors positions of the conductor support structures 105 to identify a need for maintenance or repair of selected conductor support structures 105. For example, an affected conductor support structure 105 may be moved or damaged due to a vehicular accident, a weather event, a fallen tree, or the like, such that its orientation is changed. Such an orientation change may affect the integrity of the conductors 110, may compromise neighboring conductor support structures 105, or may endanger individuals near the affected the conductor support structure 105 from fallen conductors 110 or a fallen conductor support structure 105.

In some embodiments, a conductor support structure 105 is a cylindrical post or pole, such as a wood, metal, or concrete pole. In some embodiments, a conductor support structure 105 includes multiple cylindrical posts connected by a frame. In some embodiments, a conductor support structure 105 is a tower having a frame, such as a metal frame. Sensor units 115 are be attached to some or all of the conductor support structures 105. In some embodiments, sensor units 115 are attached to a subset of the conductor support structures 105. Though, in some embodiments, a sensor unit 115 is attached to every conductor support structure 105. For example, sensor units 115 may be selectively attached to conductor support structures 105 that have characteristics representative of conductor support structures in a larger area (e.g., such conductor support structures may be in locations having environmental conditions representative of environmental conditions of other conductor support structures in a larger area). As another example, sensor units 115 may be placed selectively on conductor support structures 105 that are in locations carrying a greater risk of failure, such as windy locations, or posing a greater risk to people or objects below the conductors in the event a failure should occur, as the case may be for conductor support structures near busy intersections, schools, busy pedestrian areas, or the like.

It should be appreciated that FIG. 1 shows a simplified representation of a conductor support structure monitoring system 100. A conductor support structure monitoring system 100 may have many more conductor support structures and many more conductors 110 than illustrated. Regardless of the numbers and locations of sensor units 115 in the conductor support structure monitoring system 100, data collected at each sensor unit 115 may be communicated to one or more computing devices for processing to determine a condition, on one or more of the conductor support structures 105, indicating a current or predicted need for maintenance. In the example of FIG. 1, data from the sensor units 115 is wirelessly communicated to a monitoring unit 120. In this example, the monitoring unit 120 is illustrated as a single computing device collecting data from all of the sensor units 115. In some embodiments, in a conductor support structure monitoring system 100 spanning a large area, multiple computing devices may be used to collect and process data from the sensor units 115.

Where multiple computing devices are used to implement the monitoring unit 120, they may be located in one location or distributed across multiple locations. In the latter case, they may be connected through a network and/or organized hierarchically such that each computing device in the hierarchy may be configured to collect and process data gathered by a subset of sensor units 115. For example, one computing device may be configured to collect and process data from sensor units 115 in one geographic region, and another computing device may be configured to collect and process data from sensor units 115 in another geographic region.

In some embodiments, data is transmitted directly from each sensor unit 115 to the monitoring unit 120. In some embodiments, the data may be transmitted through one or more intermediary devices. Any suitable communication mechanism may be used for communication between the sensor units 115 and the monitoring unit 120. For example, in some embodiments, the data may be communicated in whole or in part over the power conductors themselves. As a specific example, a sensor unit connected to a central data collection point, such as monitoring unit 120, through a conductor, may transmit data over that conductor, such as via power line communication (PLC). In the event a fault or other condition prevents communication over the conductor, the sensor unit 115 may transmit data wirelessly to the monitoring unit 120 directly or indirectly through another sensor unit 115 or other suitable intermediary device. Examples of wireless communication may include cellular (e.g. 3G, 4G, 5G, LTE, etc.), Bluetooth, LoRa, Zigbee, RF, Wi-Fi, Wi-Max, and/or other wireless communication protocols applicable to a given system or installation.

Each sensor unit 115 may contain one or more types of sensors and circuitry for controlling the collection of data and transmission of that data for analysis. In some embodiments, each sensor unit may contain circuitry, such as an electronic processor, for processing the data prior to transmission. The times at which sensor data is transmitted may be periodic, randomized, and/or may be dynamically determined based on detection of changing conditions. For example, sensor data may be transmitted when a monitoring threshold configured for the sensor unit 115 is violated. In some embodiments, a reporting frequency for the sensor units 115 is increased by the monitoring unit 120 responsive to a change in the environmental conditions (e.g., a snowstorm arrives, a tree falls, it becomes windy, or the like). In some embodiments, the monitoring unit 120 polls the sensor units 115 to refresh data.

Figure 2:
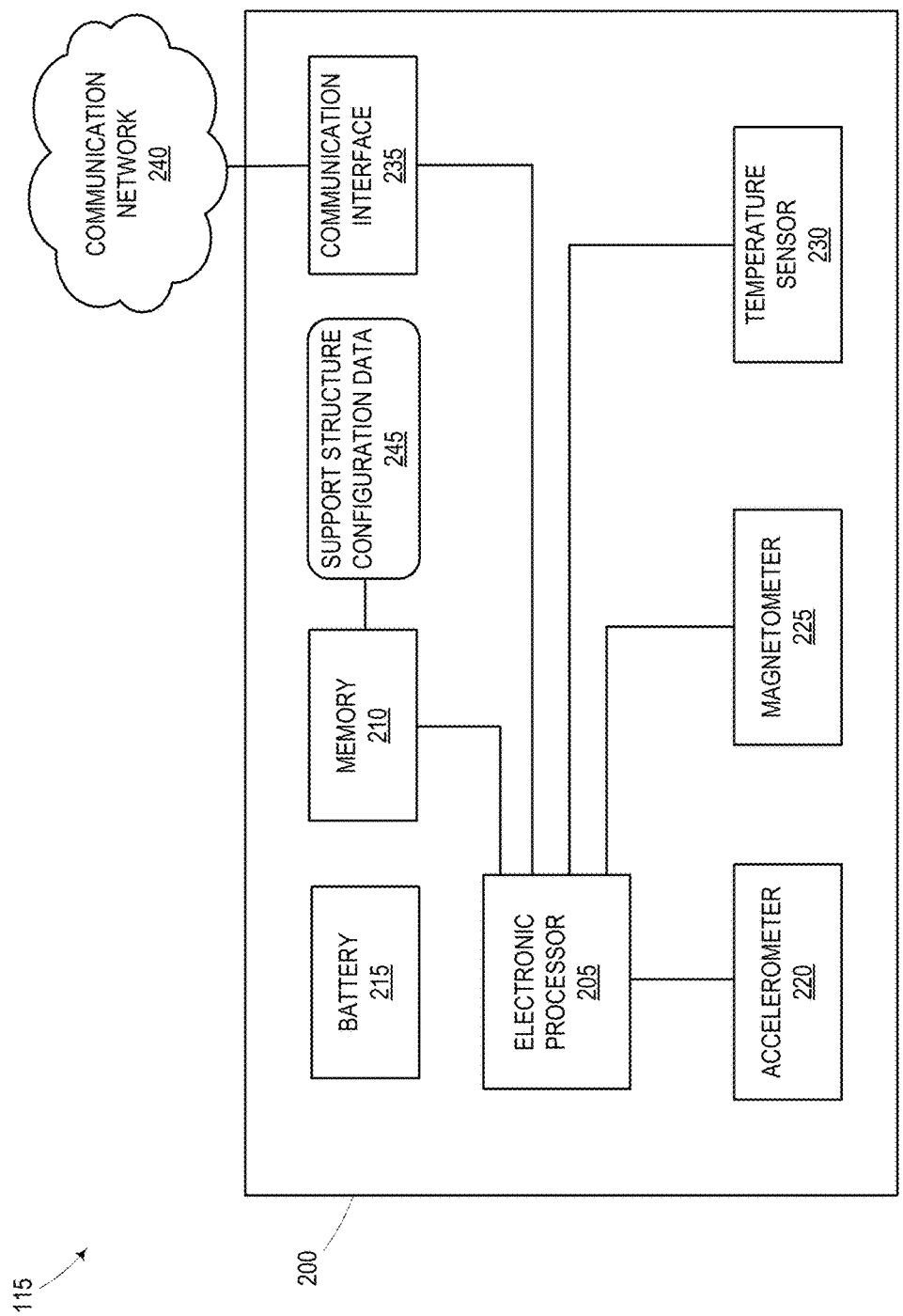
FIG. 2 is a block diagram of a sensor unit, according to some embodiments.

FIG. 2 is a simplified block diagram of a sensor unit 115, according to some embodiments. Each sensor unit 115 may contain a housing 200 that is environmentally sealed. Such a housing 200 may be manufactured with any suitable materials, including materials as are used for components used in exterior locations, such as may be found in power distribution systems and/or telephone systems. Sensors and control circuitry may be enclosed within the housing 200. One or more types of sensors may be included in a sensor unit 115, such as an accelerometer (e.g. 2-axis, 3-axis, 4-axis, etc.), a magnetometer (e.g. 2-axis, 3-axis, 4-axis, etc.), a temperature sensor (e.g. thermistor), and/or a location sensor (e.g. GPS, Glonass). As illustrated in FIG. 2, the sensor unit 115 includes an electronic processor 205, a memory 210, a battery 215, an accelerometer 220, a magnetometer 225, a temperature sensor 230, and a communication interface 235. The accelerometer 220 and magnetometer 225 may be referred to as orientation sensors. In some embodiments, the accelerometer 220 and the magnetometer 225 are three-axis devices. In some embodiments, data from the temperature sensor 230 is employed to provide temperature compensation for the accelerometer 220 and the magnetometer 225. It should be appreciated that sensor unit 115 may include any of numerous other types of sensors in addition to or instead of the above-described sensors.

The memory 210 includes read only memory (ROM), random access memory (RAM), other non-transitory computer-readable media, or a combination thereof. The electronic processor 205 is configured to communicate with the memory 210 to store data and retrieve stored data. The electronic processor 205 is configured to receive instructions and data from the memory 210 and execute, among other things, the instructions. In particular, the electronic processor 205 executes instructions stored in the memory 210 to perform the methods described herein. The battery 215 provides power to the various components of the sensor unit 115. In some embodiments, the sensor unit 115 receives external power and the battery 215 is omitted or serves to provide backup power.

The communication interface 235 (e.g., a transceiver) allows for communication between the electronic processor 205 and an external device, such as the monitoring unit 120 over a wired or wireless communication network 240. In some embodiments, the communication interface 235 may include separate transmitting and receiving components. In some embodiments, the communication interface 235 is a wireless transceiver that encodes information received from the electronic processor 205 into a carrier wireless signal and transmits the encoded wireless signal to the monitoring unit 120 over the communication network 240. The communication interface 235 also decodes information from a wireless signal received from the monitoring unit 120 over the communication network 240 and provides the decoded information to the electronic processor 205. The communication network 240 may include a power line network or a wireless network (e.g., BLUETOOTH®, Wi-Fi, Wi-Max, cellular (3G, 4G, 5G, LTE), RF, LoRa, Zigbee, and/or other wireless communication protocols applicable to a given system or installation).

In some embodiments, the memory 210 stores support structure configuration data 245 describing characteristics of the particular conductor support structure 105 associated with the sensor unit 115. In some embodiments, the support structure configuration data 245 includes support structure physical data, sensor orientation data, location data, adjacent hazard orientation data, and the like. The electronic processor 205 employs the support structure configuration data 245 in determining thresholds for signaling alert conditions to the monitoring unit 120.

In some embodiments, the monitoring unit 120 includes data processing elements similar to the sensor unit 115, such as an electronic processor, memory, a communication interface, and other elements, such as a user input device (e.g., mouse, keyboard, or touchscreen), a display, and the like. The electronic processor of the monitoring unit 120 executes instructions stored in the memory of the monitoring unit 120 to perform one or elements of the methods described herein.

Figure 3:
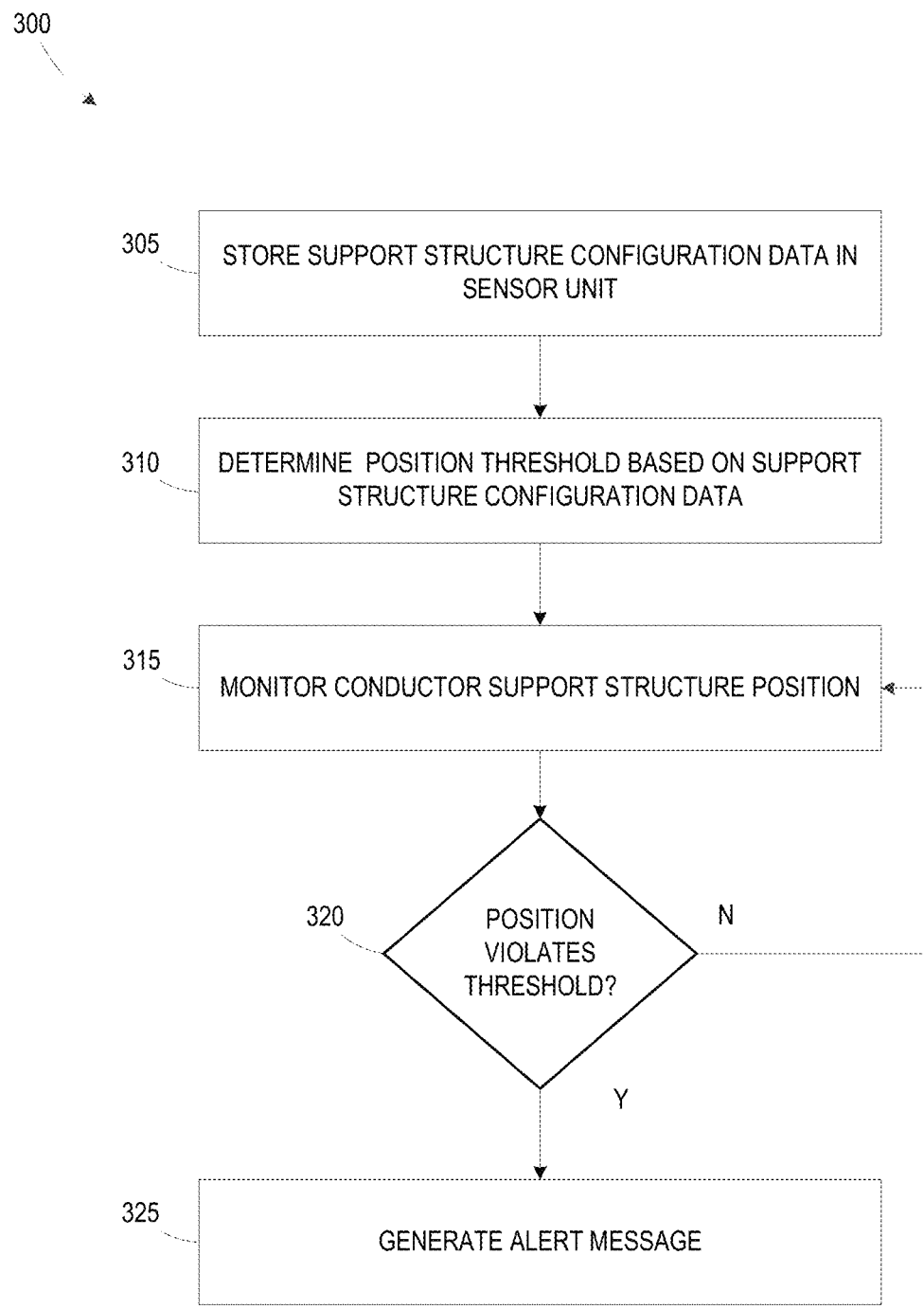
FIG. 3 is a flowchart of a method performed by a computing device for monitoring conductor support structure position, according to some embodiments.

FIG. 3 is a flowchart of a method 300 performed by a computing device for monitoring conductor support structure position, according to some embodiments. In some embodiments, the method 300 is performed by the electronic processor 205 of the sensor unit 115. In block 305, support structure configuration data 245 is stored in the sensor unit 115. For example, during installation, a technician may store the support structure configuration data 245 in the memory 210 of the sensor unit 115.

In some embodiments, the support structure configuration data 245 includes support structure physical data, such as a height of the conductor support structure 105, a conductor orientation (e.g., a relative azimuth or yaw of the conductors), a guy wire orientation (e.g., a relative azimuth or yaw of one or more guy wires), and the like. For reference, the orientation of the conductor support structure 105 is assumed to be along the Z-axis. The magnetometer 225 is tilt compensated, however, the conductor support structure 105 is assumed to be in an essentially vertical orientation.

In some embodiments, the support structure configuration data 245 includes sensor orientation data, such as a sensor elevation, a sensor offset parameter indicating the position of the sensor unit 115 relative to a center point of the conductor support structure 105 at the installation position of the sensor unit 115, and the like. In some embodiments, the support structure configuration data 245 includes location data, such as GPS coordinates. In some embodiments, the support structure configuration data 245 includes adjacent hazard orientation data, such as a relative position between the conductor support structure 105 and a nearby hazard, such as a walkway, roadway, school, or the like.

In block 310, a position threshold is determined based on the support structure configuration data 245. In some embodiments, the electronic processor 205 determines the position threshold based on the support structure configuration data 245 and one or more relationships (e.g., equations, look-up table parameters, or the like) relating the support structure configuration data 245 to the position threshold. In some embodiments, a technician installing the sensor unit 115 may enter or adjust the position threshold. In some embodiments, the position threshold varies based on radial orientation. For example, the position threshold may have a first value at a radial position transverse to the conductors and a second value at a radial position perpendicular to the conductors. The radial bands may be defined for ranges of positions, as described below.

Figure 4:
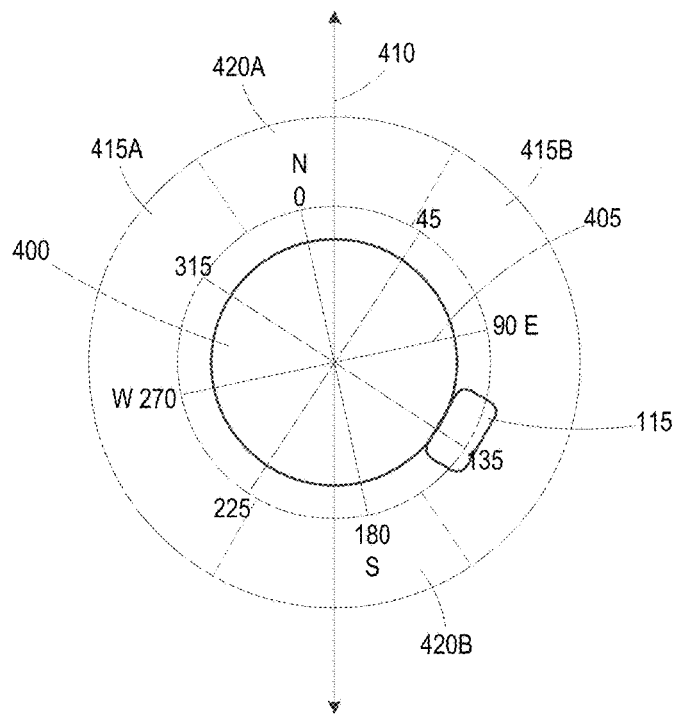
FIGS. 4 and 5 are diagrams illustrating position thresholds generated from support structure configuration data, according to some embodiments.

FIG. 4 is a diagram illustrating a position threshold, according to some embodiments. In the example of FIG. 4, a conductor support structure 400 does not include any guy wires. A compass overlay 405 indicates the orientation of the conductor support structure 400. The support structure configuration data 245 for the conductor support structure 400 specifies a height of the conductor support structure 105 and a conductor orientation 410 (e.g., 10 degrees offset from North). The sensor orientation data in the support structure configuration data 245 specifies a sensor elevation and a sensor offset parameter based on the diameter of the conductor support structure 105 and the angle of the sensor unit (e.g., 130 degrees from N) at the installation position of the sensor unit 115. In the example of FIG. 4, some movement is expected along the vector defined in a direction transverse to the conductor orientation. However, less movement is expected in a direction perpendicular to the conductor orientation.

Based on the support structure configuration data 245, radial bands 415A, 415B are defined for positions generally perpendicular to the conductor orientation and radial bands 420A, 420B are defined for positions generally transverse to the conductor orientation. The perpendicular radial bands 415A, 415B have position thresholds that are different than the position threshold of the transverse radial bands 420A, 420B. For example, the perpendicular radial bands 415A, 415B may have a position threshold of approximately 5 degrees (i.e., relative to the Z-axis), and the transverse radial bands 420A, 420B may have a position threshold of about 8 degrees. When installing the sensor unit 115, a technical may be provided with a visual display of the radial bands 415A, 415B, 420A, 420B and may be able to manually adjust the positioning of the radial bands 415A, 415B, 420A, 420B.

Figure 5:
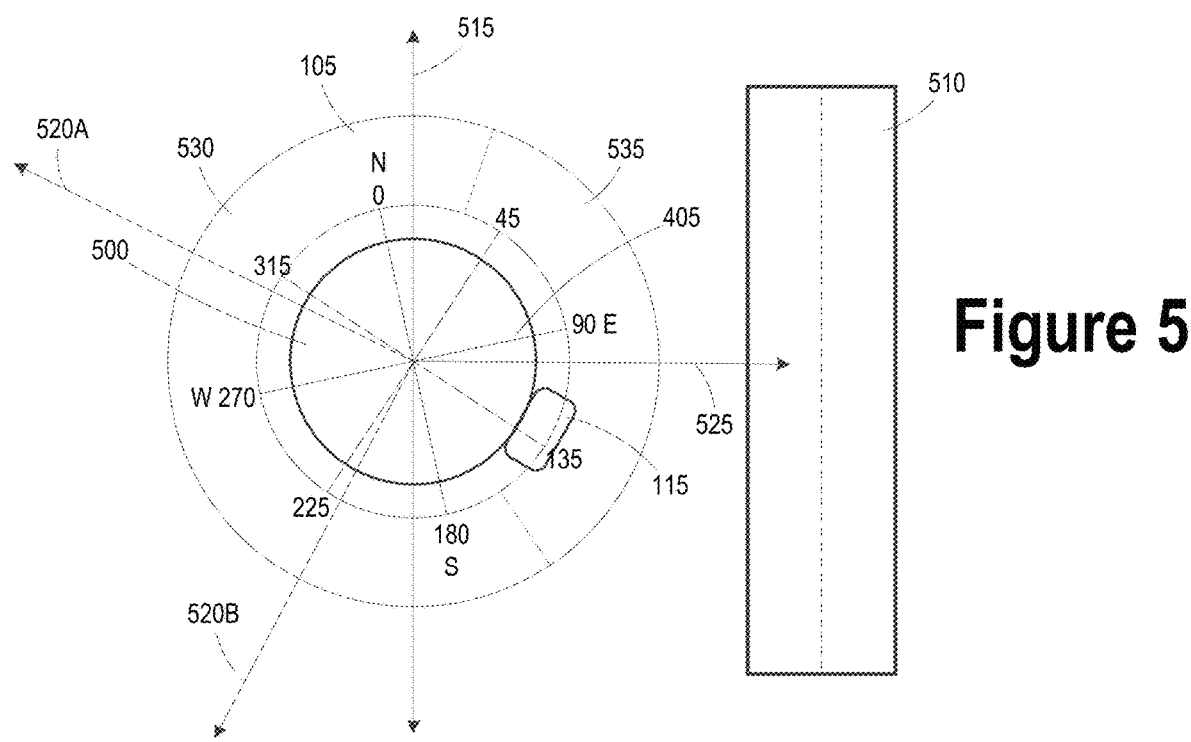

FIG. 5 is a diagram illustrating an alternative position threshold, according to some embodiments. A compass overlay 505 indicates the orientation of the conductor support structure 500. In the example of FIG. 5, the conductor support structure 500 includes guy wires and is positioned adjacent a roadway 510. The support structure configuration data 245 for the conductor support structure 500 specifies a height of the conductor support structure 105, a conductor orientation 515 (e.g., 10 degrees offset from North), guy wire support directions 520A, 520B (e.g., 310 degrees and 220 degrees), and hazard direction 525 (i.e., associated with the roadway 510). The sensor orientation data in the support structure configuration data 245 specifies a sensor elevation and a sensor offset parameter based on the diameter of the conductor support structure 105 and the angle of the sensor unit (e.g., 130 degrees from N) at the installation position of the sensor unit 115. In the example of FIG. 5, virtually no movement is expected in a direction opposite the guy wire support directions 520A, 520B. Generally, the guy wires are installed and configured to reduce the likelihood of the conductor support structure 500 falling toward the roadway 510.

Based on the support structure configuration data 245, a radial band 530 is defined for positions generally opposite the guy wire support directions 520A, 520B and in the hazard direction 525, and a radial band 535 is defined for positions generally in the guy wire support directions 520A, 520B and opposite the hazard direction 525. The radial band 530 has a position threshold that is different than the position threshold of the radial band 535. For example, the radial band 530 may have a position threshold of approximately 5 degrees (i.e., relative to the Z-axis), and the radial band 535 may have a position threshold of about 8 degrees. In some embodiments, the guy wires in the example of FIG. 5 may be omitted and the radial bands 530, 535 may be determined based on the hazard direction 525. When installing the sensor unit 115, a technical may be provided with a visual display of the radial bands 530, 535 and may be able to manually adjust the positioning of the radial bands 530, 535.

Returning to FIG. 3, the electronic processor 205 monitors the conductor support structure position at block 315. The position may be determined using data from the accelerometer 220, the magnetometer 225 or both. The sensor offset data in the support structure configuration data 245 may be used to correlate the measurements of the sensor unit 115 to actual position of the conductor support structure 105. The sensor unit 115 calculates the vertical orientation of the conductor support structure 105 based on input from the accelerometer 220, where the Z-axis is known to be physically and permanently aligned with the longitudinal axis of the conductor support structure 105. In some examples, a three axis accelerometer 220 is used such that variations of the support structure position in either an x-direction or a y-direction detect a tilt in the position of the conductor support structure 105. In some embodiments, the accelerometer 220 is able to determine sub 1-degree variations in angle (i.e. tilt) of the conductor support structure 105.

At block 320, the electronic processor 205 identifies whether the conductor support structure position violates the position threshold determined at block 310. As described above in reference to FIG. 4, the position threshold may vary depending on radial position. In some embodiments, the electronic processor 205 identifies whether the conductor support structure position violates the position threshold based on time series data. For example, where the monitored conductor support structure position indicates that the conductor support structure is swaying back, such as during a galloping event, a threshold violation may be identified. In some embodiments, a galloping position threshold may be different than, such as less than, the static position threshold shown in FIG. 4. In some embodiments, a temperature threshold is used in conjunction with a galloping position threshold, since galloping generally occurs when temperatures are at or below freezing, a strong wind is present, and freezing precipitation has or is occurring. Data from the temperature sensor 230 may be used to enable use of the galloping position threshold. In some embodiments, the monitoring unit 120 determines whether the weather conditions are such that line galloping could occur and signals the sensor units 115, such as via the communication interfaces 235, to enable the use of a galloping position threshold. In some embodiments, the sensor unit 115 employs a waiting period after an initial position threshold violation is detected to determine whether the position returns to within the position threshold. The position threshold violation is identified responsive to the position threshold violation persisting after the waiting period has elapsed.

In some embodiments, thresholds are employed for parameters other than position. In some embodiments, a force threshold violation is identified responsive to a force reading from the accelerometer 220 exceeding a threshold indicative of a vehicle or other body impacting the conductor support structure 105. For example, the accelerometer 220 may measure an acceleration or other movement of the conductor support structure 105 indicating an impact. In some examples, the accelerometer 220 and/or electronic processor 205 are calibrated to detect an impact of at least a 500 lb object (e.g. vehicle) travelling at least 15 miles per hour (mph). However, the accelerometer 220 and/or electronic processor 205 may also be configured to detect impacts of objects weighing more than 500 lbs or less than 500 lbs, and travelling at more than 15 mph or less than 15 mph.

In some embodiments, a temperature threshold violation is identified responsive to a temperature reading from the temperature sensor 230 indicating a possible fire. In some examples, the temperature sensor 230 may be installed in a case that extends beyond the potted housing 200 of the sensor unit 115, such that a rise in the temperature of the air surrounding the conductor support structure 105 may indicate a fire on the conductor support structure 105 and/or on the ground in proximity to the conductor support structure 105. In some instances, the electronic processor 205 may evaluate a change of temperature over time to determine whether a fire is indicated (e.g. a temperature threshold violation has occurred). For example, an increase of 20 degrees Celsius ("C") over a 30 second time period may result in a temperature threshold violation. However, other temperature thresholds are contemplated.

In some embodiments, a fault current violation is identified responsive to a reading from the magnetometer 225 identifying a fault current in the conductors 110. Example faults may include short-circuits, such as phase-to-ground and phase-to-phase. In one embodiment, the magnetometer 335 is configured to monitor an electromagnetic (EMI) field generated by AC current flowing in one or ore conductors supported by the conductor support structure 105 to determine whether an AC fault current spike has occurred. In some embodiments, the AC fault current spike may be determined via the magnetometer 225 after only three cycles of the AC current (approximately 50 ms), and an associated AC current fault alert may be generated.

At block 325, the electronic processor 205 generates an alert message responsive to the conductor support structure position violating the position threshold at block 320. In some embodiments, the sensor unit 115 sends an alert message to the monitoring unit 120 indicting the alert condition. In some embodiments, the alert message includes the location of the conductor support structure 105, the determined conductor support structure position (e.g., offset from normal), the presence of any adjacent hazards, an alert level generated based on the direction or magnitude of the violation, and the like. In the case of an impact event, the alert message may indicate an impact, and the sensor unit 115 may continue monitoring the position at a higher data rate for a predetermined time interval after detecting the impact to determine whether the position has changed. A subsequent alert message may be generated based on the changed position. In the case of an AC current fault condition, the sensor unit 115 sends an alert message indicating the AC current fault to one or more upstream distribution devices to open the electrical circuit (e.g. circuit breakers) or to take other actions to address the AC current fault condition.

In some embodiments, the monitoring unit 120 combines data from different sensor units 115. For example, where galloping is occurring, alerts should be generated by sensor units 115 on neighboring conductor support structures 105. Similarly, AC fault currents should be detected by sensor units 115 on neighboring conductor support structures 105.

The alert messages provided by the sensor unit 115 may provide information for prioritizing maintenance or repair activities. Priority may be given to conductor support structures 105 with large position offsets, since conductor support structures 105 may be completely down and may be associated with downed power conductors. Priority may also be given to conductor support structures 105 where the support structure configuration data indicates the presence of nearby hazards, such as roadways, schools, or other high risk areas. In an instance where the alert message indicates a high temperature, the monitoring unit 120 may poll nearby sensor units 115 to attempt to identify whether a fire may be present on nearby utility support structures 105, thereby identifying the scope of the fire. In some embodiments, the fire may destroy the sensor unit 115 soon after the temperature alert is identified and communicated, so the presence of the fire or the spreading of the fire may be confirmed by evaluating the temperature at adjacent sensor units 115.

In the foregoing specification, specific embodiments have been described. However, one of ordinary skill in the art appreciates that various modifications and changes may be made without departing from the scope of the disclosure as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

What is claimed is:
1. A sensor unit, comprising:
one or more orientation sensors coupled to a conductor support structure, wherein the one or more orientation sensors are configured to sense positional data of the conductor support structure;
an electronic processor in electronic communication with the one or more orientation sensors; and a memory coupled to the electronic processor and storing support structure configuration data and instructions that, when executed by the electronic processor, cause the electronic processor to:
   determine a position of the conductor support structure associated with the sensor unit based on data from the one or more orientation sensors based on the sensed positional data;
   determine whether the determined position of the conductor support structure violates one or more predetermined position thresholds associated with the conductor support structure, wherein the predetermined position thresholds are determined based on the stored support structure configuration data;
   generate an alert message responsive to determining that the determined position violates the one or more predetermined position thresholds;
   transmit the alert message via a communication interface of the sensor unit,
   wherein the one or more predetermined position thresholds include at least a radial position threshold, wherein the radial position threshold is determined based on a first radial band associated with a first range of radial positions transverse to a conductor orientation with respect to the conductor support structure and a second radial band associated with a second range of radial positions perpendicular to the conductor orientation with respect to the conductor support structure.

2. The sensor unit of claim 1, wherein the support structure configuration data comprises at least one selected from the group selected from the group consisting of conductor orientation data, guy wire orientation data, and hazard orientation data.

3. The sensor unit of claim 1, wherein the support structure configuration data specifies a guy wire support direction, and the second radial band is associated with positions opposite the guy wire support direction.

4. The sensor unit of claim 1, wherein the support structure configuration data specifies a hazard direction, and the second radial band is associated with positions in the hazard direction.

5. The sensor unit of claim 1, comprising a temperature sensor coupled to the electronic processor, wherein the electronic processor is configured to:
   enable a galloping position threshold responsive to a temperature indicated by the temperature sensor being less than a predetermined value; and
   generate an alert message responsive to determining that the monitored position violates the galloping position threshold.

6. The sensor unit of claim 1, comprising a communication interface coupled to the electronic processor, wherein the electronic processor is further configured:
   receive a message over the communication interface to enable a galloping position threshold; and
   send an alert message over the communication interface responsive to determining that the position violates the galloping position threshold.

7. A system comprising:
a plurality of sensor units, wherein each sensor unit is coupled to a respective conductor support structure and comprising:
   one or more orientation sensors configured to sense position data of the conductive support structure;
   an electronic processor in electronic communication with the one or more orientation sensors; and
   a memory coupled to the electronic processor and storing instructions that, when executed by the electronic processor, cause the electronic processor to:
      determine a position of the conductor support structure based on the sensed positional data;
      determine whether the determined position of the conductor support structure violates one or more predetermined position thresholds associated with the conductor support structure, wherein the predetermined position thresholds are stored in the memory;
      generate an alert message responsive to determining that the determined position violates the one or more predetermined position thresholds; and
   a monitoring unit in electronic communication with at least one of the plurality of sensor units and configured to receive alert messages from the plurality of sensor units, and wherein the monitoring unit comprises an electronic processor configured to generate a prioritized list of maintenance activities based on the alert messages.

8. The system of claim 7, wherein the memory stores support structure configuration data, the alert messages include the support structure configuration data for the associated sensor units, and the monitoring unit is configured to generate the prioritized list of maintenance activities based on the support structure configuration data.

9. A method for monitoring conductor support structures, comprising:
   receiving in an electronic processor data from an orientation sensor in a sensor unit coupled to a conductor support structure;
   determining, in the electronic processor, a position of the conductor support structure associated with the sensor unit based on data from the orientation sensor;
   communicating an alert message, by the electronic processor, on a communication interface of the sensor unit responsive to determining that the determined position violates a conductor support structure position threshold,
   where the conductor support structure position threshold is generated based on support structure configuration data associated with the conductor support structure associated with the sensor unit; and
   wherein the conductor support structure position threshold includes at least a radial position threshold, wherein the radial position threshold is determined based on a first radial band associated with a first range of radial positions having a first value and a second radial band associated with a second range of radial positions having a second value, wherein the second value is less than the first value.

10. The method of claim 9, comprising:
   receiving alert messages from a plurality of sensor units; and
   generating a prioritized list of maintenance activities based on the alert messages.

11. The method of claim 10, wherein the alert messages include the support structure configuration data for the associated sensor units, and the method comprises:
   generating the prioritized list of maintenance activities based on the support structure configuration data.

12. The method of claim 9, wherein the support structure configuration data comprises at least one selected from the group of conductor orientation data, guy wire orientation data, and hazard orientation data.

13. The method of claim 9, wherein the support structure configuration data specifies a conductor orientation, the first radial band is associated with positions transverse to the conductor orientation, and the second radial band is associated with positions perpendicular to the conductor orientation.

14. The method of claim 9, wherein the support structure configuration data specifies a guy wire support direction, and the second radial band is associated with positions opposite the guy wire support direction.

15. The method of claim 9, wherein the support structure configuration data specifies a hazard direction, and the second radial band is associated with positions in the hazard direction.

16. The method of claim 9, comprising:
    enabling a galloping position threshold responsive to a temperature indicated by a temperature sensor of the sensor unit being less than a predetermined value; and
    generating an alert message responsive to determining that the determined position violates the galloping position threshold.

17. The method of claim 9, comprising:
    receiving a message over the communication interface to enable a galloping position threshold; and
    sending an alert message over the communication interface responsive to determining that the position violates the galloping position threshold.

* * * * *